United States Patent
Zhang et al.

(10) Patent No.: US 11,527,161 B2
(45) Date of Patent: Dec. 13, 2022

(54) METHODS AND SYSTEMS FOR DETECTING A SPEED FUNNEL IN A REGION

(71) Applicant: HERE Global B.V., Eindhoven (NL)

(72) Inventors: Zhenhua Zhang, Chicago, IL (US); Leon Stenneth, Chicago, IL (US)

(73) Assignee: HERE GLOBAL B.V., Eindhoven (NL)

( * ) Notice: Subject to any disclaimer, the term of this patent is extended or adjusted under 35 U.S.C. 154(b) by 403 days.

(21) Appl. No.: 16/859,578

(22) Filed: Apr. 27, 2020

(65) Prior Publication Data

US 2021/0335132 A1 Oct. 28, 2021

(51) Int. Cl.
*G08G 1/16* (2006.01)
*G06K 9/00* (2022.01)
*G08G 1/0962* (2006.01)
*G06V 20/58* (2022.01)
*G06V 20/56* (2022.01)

(52) U.S. Cl.
CPC .......... *G08G 1/167* (2013.01); *G06V 20/582* (2022.01); *G08G 1/09623* (2013.01); *G06V 20/588* (2022.01)

(58) Field of Classification Search
CPC .. G08G 1/167; G08G 1/09623; G08G 1/0112; G08G 1/0129; G08G 1/096708; G06V 20/582; G06V 20/588; G06V 10/751; G06K 9/622
See application file for complete search history.

(56) References Cited

U.S. PATENT DOCUMENTS

| | | | |
|---|---|---|---|
| 6,560,529 B1 * | 5/2003 | Janssen | G08G 1/096725 340/988 |
| 9,056,395 B1 * | 6/2015 | Ferguson | B60W 30/09 |
| 9,070,293 B2 * | 6/2015 | Roeber | G08G 1/09623 |
| 9,489,601 B2 | 11/2016 | Fairfield et al. | |
| 10,339,398 B2 | 7/2019 | Fotta | |
| 2008/0137908 A1 * | 6/2008 | Stein | G06V 20/582 382/103 |

(Continued)

FOREIGN PATENT DOCUMENTS

WO 2018210468 A1 11/2018

*Primary Examiner* — Mussa A Shaawat
(74) *Attorney, Agent, or Firm* — Peter H. Yu; Here Global B.V.

(57) ABSTRACT

The disclosure provides a method, a system, and a computer program product for detecting a speed funnel in a region. The method comprises obtaining a plurality of traffic object observations for the region and determining at least one first learned traffic object, based on feature-based clustering of the plurality of traffic object observations. The method also includes generating at least one candidate traffic object group by grouping the at least one first learned traffic object and a second learned traffic object and performing validation of the at least one candidate traffic object group based on a statistical model. The method further includes generating at least one validated candidate traffic object group as a result of the validation of the at least one candidate traffic object group and merging the at least one validated candidate traffic object group with a second validated candidate traffic object group to detect the speed funnel.

20 Claims, 9 Drawing Sheets

(56) References Cited

U.S. PATENT DOCUMENTS

| | | | |
|---|---|---|---|
| 2013/0101174 A1* | 4/2013 | Meis | G08G 1/096775 |
| | | | 382/104 |
| 2013/0245943 A1* | 9/2013 | Hiestermann | G01C 21/3469 |
| | | | 701/533 |
| 2013/0261970 A1* | 10/2013 | Papajewski | G01C 21/32 |
| | | | 701/540 |
| 2015/0161886 A1* | 6/2015 | Kesting | G08G 1/01 |
| | | | 701/117 |
| 2015/0268053 A1* | 9/2015 | Yu | B60L 15/2045 |
| | | | 701/22 |
| 2015/0302747 A1 | 10/2015 | Ro | |
| 2016/0275793 A1* | 9/2016 | Yokochi | G06V 20/582 |
| 2018/0365507 A1 | 12/2018 | Hackeloeer et al. | |
| 2019/0294173 A1* | 9/2019 | Szubbocsev | B60W 60/0023 |
| 2019/0325349 A1* | 10/2019 | Zhang | G06N 5/046 |
| 2019/0384294 A1 | 12/2019 | Shashua et al. | |
| 2020/0042807 A1* | 2/2020 | Schutzmeier | G08G 1/0141 |
| 2020/0193194 A1* | 6/2020 | Zhang | B60W 50/0098 |
| 2020/0193809 A1* | 6/2020 | Zhang | G08G 1/0145 |
| 2020/0193823 A1* | 6/2020 | Zhang | G08G 1/0112 |
| 2020/0300658 A1* | 9/2020 | Zhang | G01C 21/30 |
| 2021/0142666 A1* | 5/2021 | Beaudry | H04W 4/025 |
| 2021/0237767 A1* | 8/2021 | Khoreva | G06N 3/0454 |

\* cited by examiner

400

| Traffic object observation ID | Sign Type | Sign Value | Link Data | Location Data | Driving Direction |
|---|---|---|---|---|---|
| 401 | 403 | 405 | 407 | 409 | 411 |

FIG. 4

METHODS AND SYSTEMS FOR DETECTING A SPEED FUNNEL IN A REGION

TECHNOLOGICAL FIELD

The present disclosure generally relates to routing and navigation, and more particularly relates to systems for detecting a speed funnel in a region.

BACKGROUND

Various navigation applications are available to provide navigation assistance, for example directions for driving, walking, or other modes of travel. Web-based and mobile app-based systems offer navigation applications that allow a user to request directions from one point to another. Often, a route traversed or to be traversed by a user encompasses several roadblocks such as roadwork zones, lane closure, or a diversion. For example, a route from a location may encompass traversing highways on which one or more lanes may merge into one or more other lanes due to traffic closure, accident, or road repair. At such roadblocks, it may be important to inform vehicles about the upcoming change in road condition so that the vehicles can timely reduce their speed to a value suitable for traversing the road condition.

BRIEF SUMMARY

Often times, such road conditions are indicated using speed signs of decreasing value. Further, in order to identify roadwork zones, autonomous vehicles may detect speed limit signs that are in close vicinity or along a driving path of the roadwork zone. The vehicles are capable of reporting individual speed limit observations on detecting such speed limit signs. Typically, sign values of the speed limit signs indicate a decrease towards the roadwork zone replicating a funnel. Therefore, the speed limit signs with the reducing sign values are referred to as a speed funnel. However, a speed funnel may not necessarily identify a roadwork zone. Many a times, a speed funnel may indicate a transition from a highway to ramps. It would be advantageous to detect a speed funnel only on a route towards a destination of the user for identifying roadwork zones en route the destination. Accordingly, in order to provide accurate and reliable navigation assistance, it is important to identify such roadblocks well in advance. Towards this end, it is essential to detect speed funnels used for indicating such roadblocks such as a roadwork zone for autonomous vehicles and semi-autonomous vehicles to make a smooth transition from an autonomous mode to a manual mode when approaching a roadwork zone.

Also, for vehicles, especially autonomous vehicles, detecting such signs well in advance is of utmost importance to avoid collisions and undue mishaps.

Accordingly, there is a need for detecting speed funnels in a region to avoid such mishaps and to provide reliable navigation assistance. Example embodiments of the present disclosure provide a system, a method, and a computer program product for detecting speed funnels in a region using a statistical model.

Some example embodiments disclosed herein provide a method for detecting a speed funnel in a region. The method comprises obtaining a plurality of traffic object observations for the region and determining at least one first learned traffic object based on feature-based clustering of the plurality of traffic object observations. The method may include generating at least one candidate traffic object group by grouping the at least one first learned traffic object and a second learned traffic object based on a filtering criteria. The method may further include performing validation of the at least one candidate traffic object group based on a statistical model. The method may further include generating at least one validated candidate traffic object group as a result of the validation of the at least one candidate traffic object group, wherein the at least one validated candidate traffic object group comprises a group of traffic objects connected by a true route. The method may further include merging the at least one validated candidate traffic object group with a second validated candidate traffic object group to detect the speed funnel.

According to some example embodiments, determining the at least one first learned traffic object based on the feature-based clustering of the plurality of traffic object observations comprises determining a first cluster of traffic object observations, based on a location criteria. The method may further include determining a second cluster of traffic object observations from the first cluster of traffic object observations based on a direction criteria. The method may further include computing an average location parameter value and an average direction parameter value for the second cluster of traffic object observations and determining the at least one first learned traffic object as a traffic object corresponding to the average location parameter value and the average direction parameter value.

According to some example embodiments, the filtering criteria comprises one or more of a first condition that a distance between the at least one first learned traffic object and the second learned traffic object is greater than a first threshold distance and less than a second threshold distance, a second condition that an angle between a driving direction of the at least one first learned traffic object and a second driving direction of the second learned traffic object is less than a threshold angle, a third condition that the at least one first learned traffic object and the second learned traffic object satisfy a sight criteria and a fourth condition that a difference between a speed value associated with the at least one first learned traffic object and a second speed value associated with the second learned traffic object is less than a threshold speed value.

According to some example embodiments, merging the at least one validated candidate traffic object group with a second validated traffic object group to detect the speed funnel comprises filtering traffic objects in the at least one validated candidate traffic object group and the second validated traffic object group based on a distance criteria to obtain a set of filtered traffic objects. The method may include determining a parameter value associated with each traffic object in the set of filtered traffic objects and merging the at least one validated candidate traffic object group and the second validated traffic object group, based on the parameter value associated with each traffic object in the set of filtered traffic objects.

According to some example embodiments, the method further comprises updating the map data of the region based on the detected speed funnel.

According to some example embodiments, the statistical model is a Hidden Markov Model.

According to some example embodiments, performing validation of the at least one candidate traffic object group comprises determining map matched link data associated with each learned traffic object in the at least one candidate traffic object group, based on map data of the region and determining a connecting probability value between the at least one first learned traffic object and the second learned traffic object in the at least one candidate traffic object group based on one or more transition probability values associated with the statistical model and performing validation of the at least one candidate traffic object group based on the connecting probability value.

According to some example embodiments, the method may further comprise determining the one or more transition probability values based on the map matched link data associated with respective learned traffic object of the at least one candidate traffic object group and determining the connecting probability based on a function of the one or more transition probability values.

According to some example embodiments, the one or more transition probability values further comprise one or more of a first transition probability value associated with a connectivity feature of the map-matched link data associated with respective learned traffic object in the at least one candidate traffic object group, a second transition probability value associated with a driving direction change feature of the map-matched link data associated with each learned traffic object in the at least one candidate traffic object group or a third transition probability value associated with an on route distance between the at least one first learned traffic object and the second learned traffic object in the at least one candidate traffic object group.

According to some example embodiments, the detected speed funnel corresponds to an upcoming travel zone and the method further comprises sending a notification to one or more vehicles about the upcoming travel zone.

According to some example embodiments, sending the notification further comprises sending an instruction to adjust a vehicle speed.

According to some example embodiments, adjusting the vehicle speed comprises decelerating the one or more vehicles within a threshold distance from start of the upcoming travel zone.

According to some example embodiments, the upcoming travel zone comprises one or more of a roadwork zone, a city start location, a tunnel, a bridge, a road curvature region, or a freeway merging zone.

Some example embodiments disclosed herein provide a system for detecting a speed funnel in a region, the system comprising a memory configured to store computer-executable instructions and one or more processors configured to execute the instructions to obtain a plurality of traffic object observations for the region. The one or more processors are further configured to determine at least one first learned traffic object based on feature-based clustering of the plurality of traffic object observations. The one or more processors are further configured to generate at least one candidate traffic object group by grouping the at least one first learned traffic object with a second learned traffic object based on a filtering criteria. The one or more processors are further configured to perform validation of the at least one candidate traffic object group based on a statistical model. The one or more processors are further configured to generate at least one validated candidate traffic object group as a result of the validation of the at least one candidate traffic object group, wherein the at least one validated candidate traffic object group comprises a group of traffic objects connected by a true route. The one or more processors are further configured to merge the at least one validated candidate traffic object group with a second validated candidate traffic object group to detect the speed funnel.

Some example embodiments disclosed herein provide a computer programmable product comprising a non-transitory computer readable medium having stored thereon computer executable instruction which when executed by one or more processors, cause the one or more processors to carry out operations for detecting a speed funnel in a region, the operations comprising obtaining a plurality of traffic object observations for the region. The operations further comprise determining at least one first learned traffic object, based on feature-based clustering of the plurality of traffic object observations. The operations further comprise generating at least one candidate traffic object group by grouping the at least one first learned traffic object with a second learned traffic object based on a filtering criteria. The operations further comprise performing validation of the at least one candidate traffic object group based on a statistical model. The operations further comprise generating at least one validated candidate traffic object group as a result of the validation of the at least one candidate traffic object group, wherein the at least one validated candidate traffic object group comprises a group of traffic objects connected by a true route. The operations further comprise merging the at least one validated candidate traffic object group with a second validated candidate traffic object group to detect a speed funnel.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Figure 1:
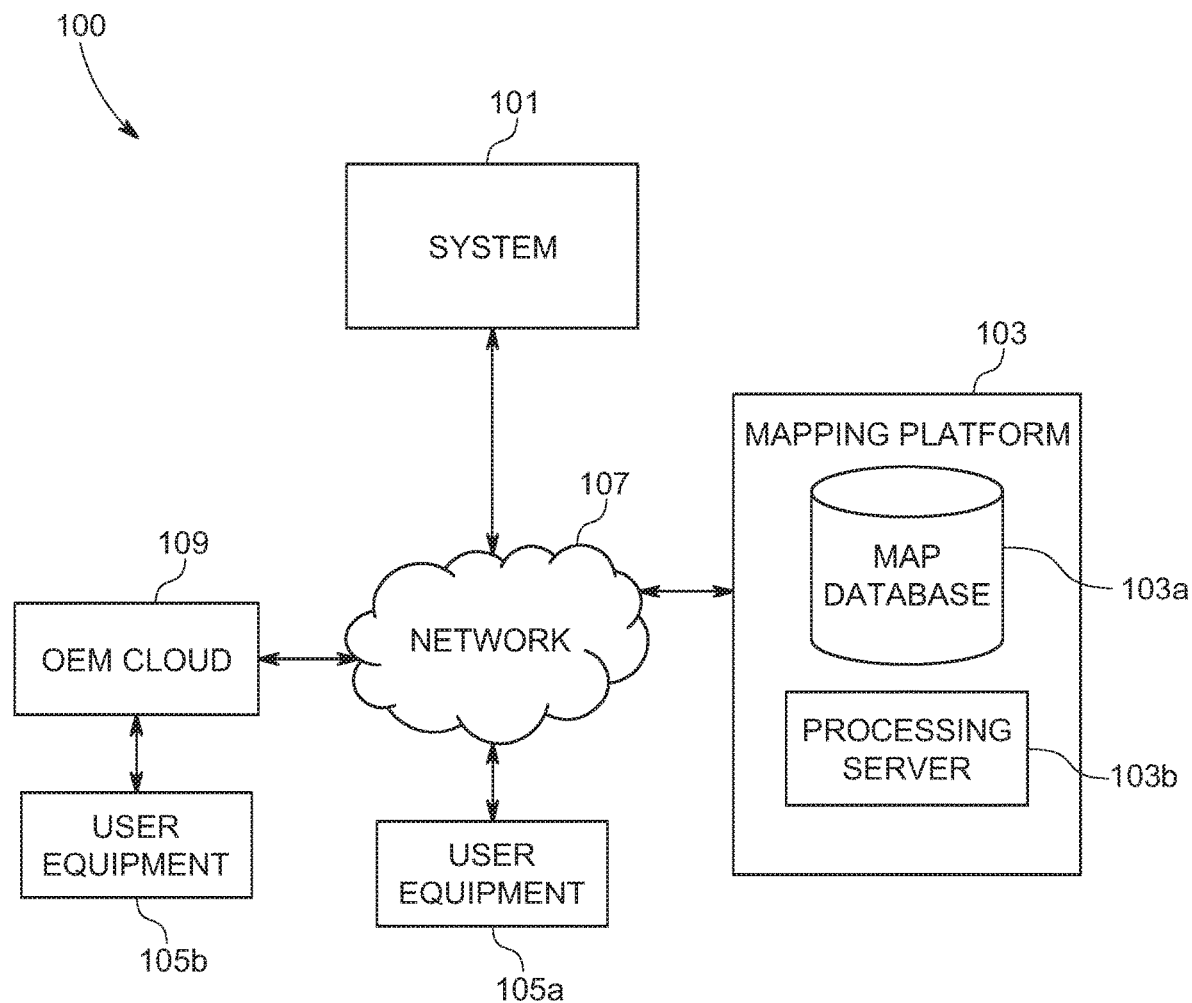
Figure 2:
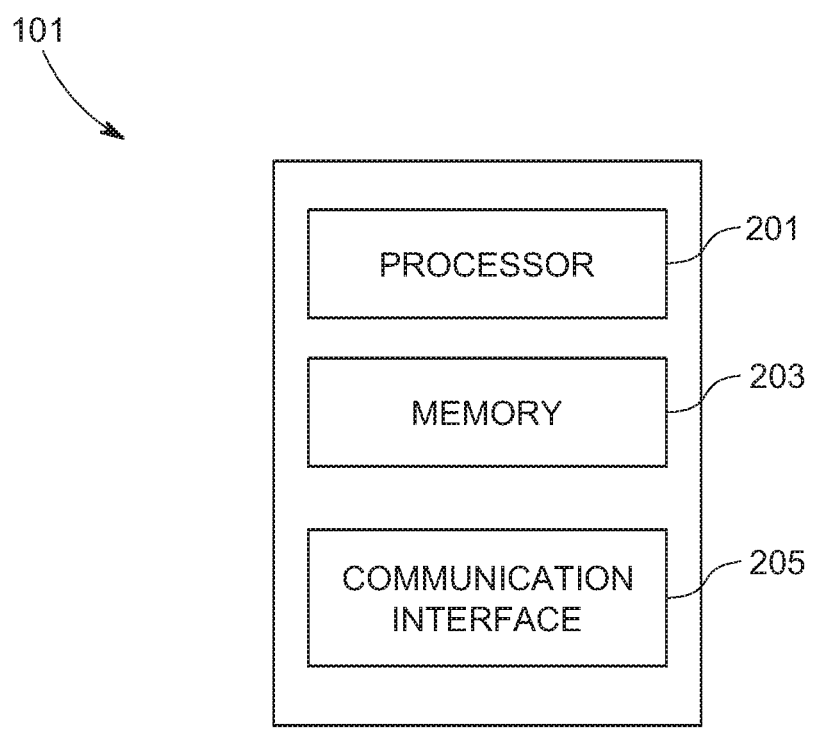
Figure 3:
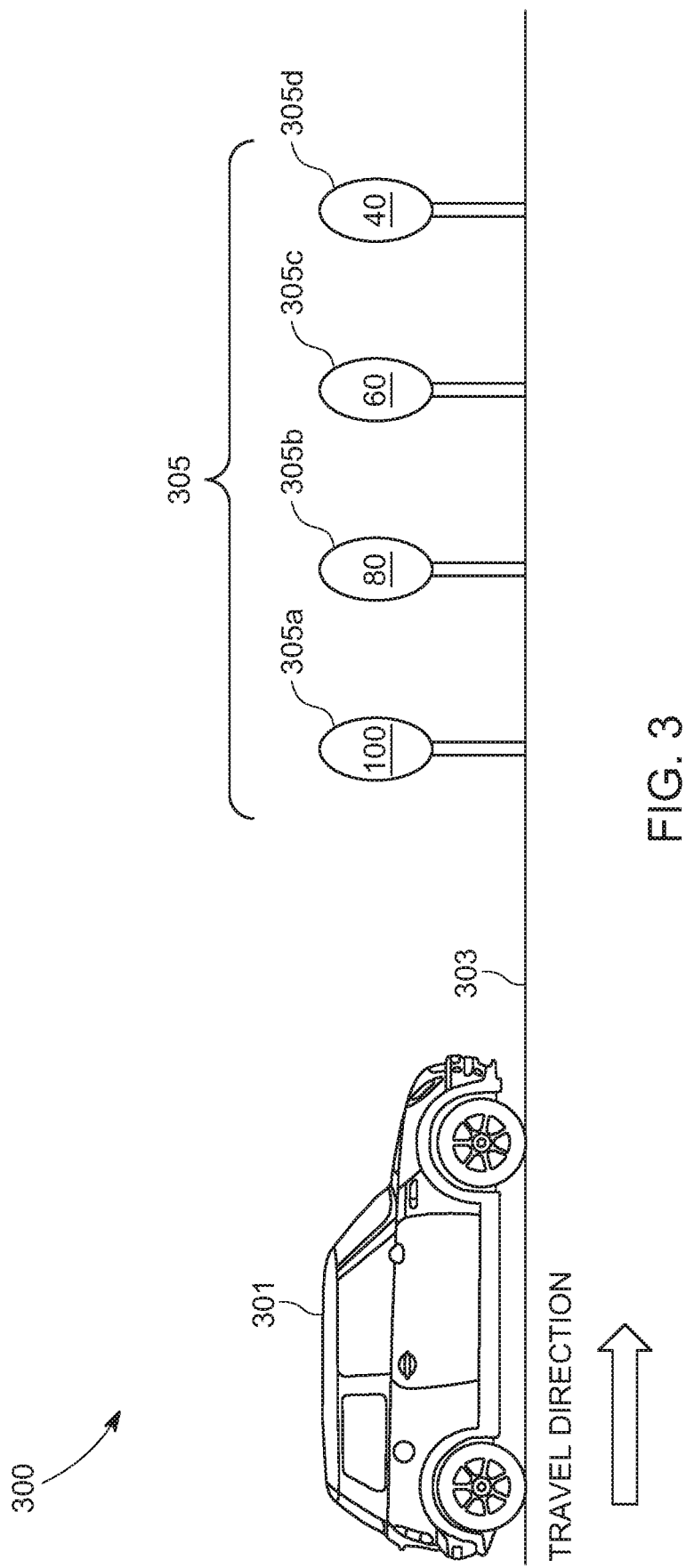
Figure 5:
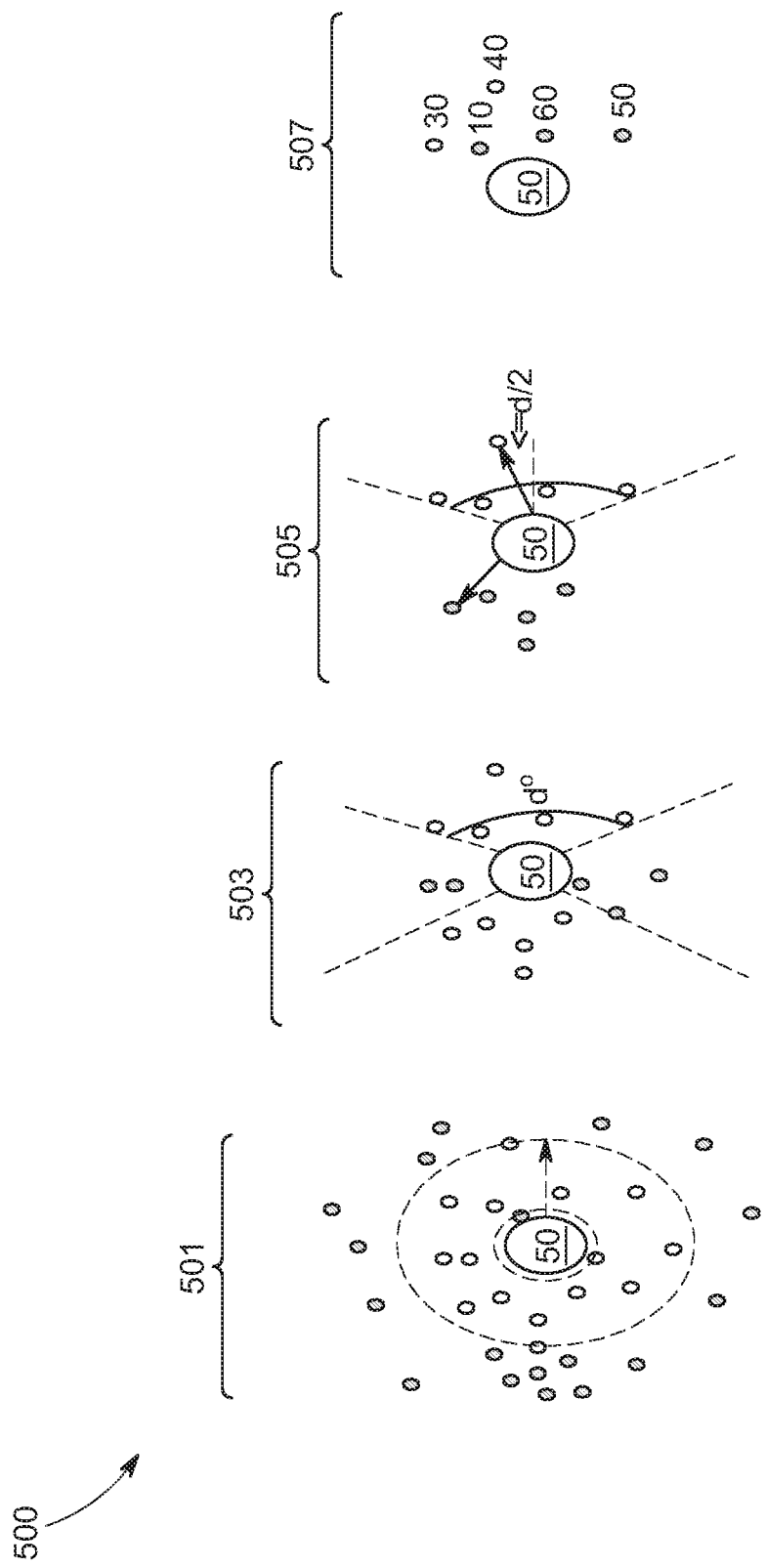
Figure 6:
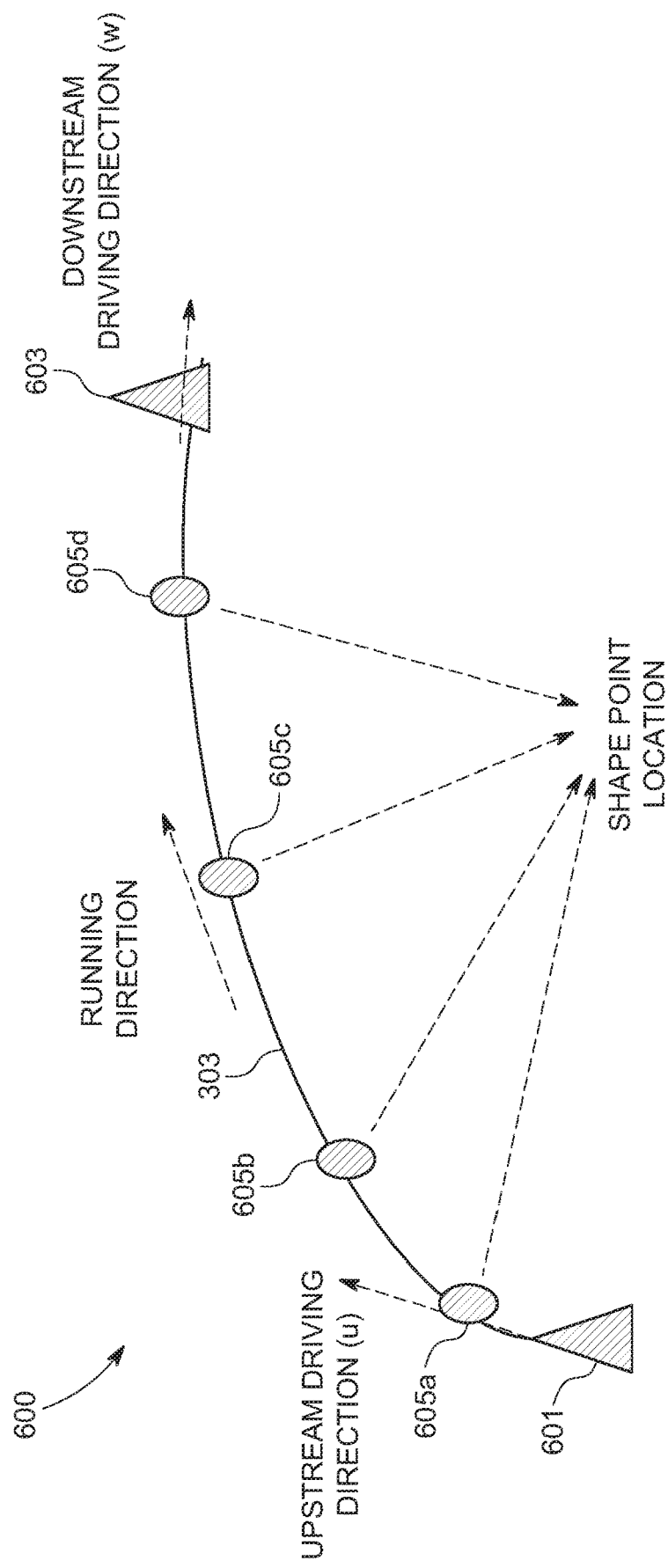
Figure 7:
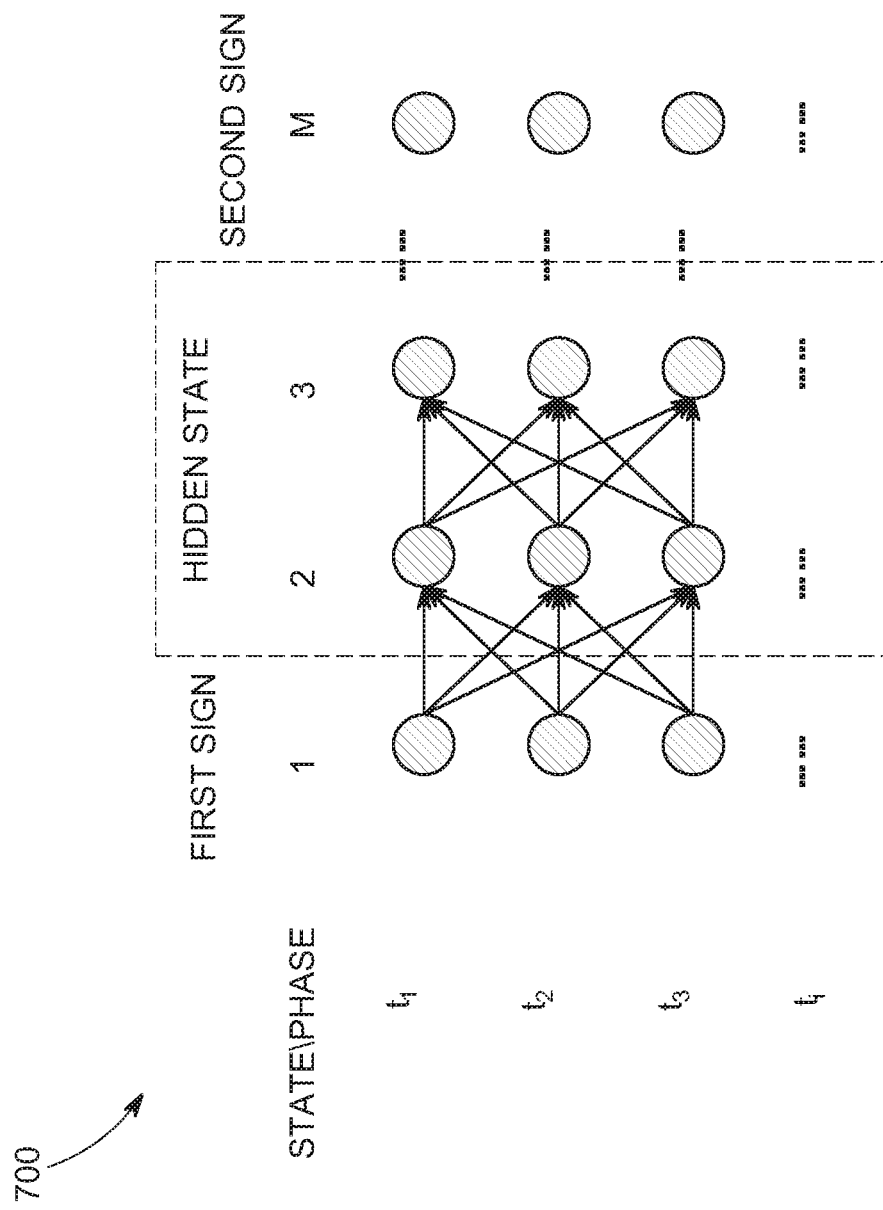
Figure 8:
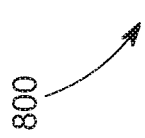
Figure 9:
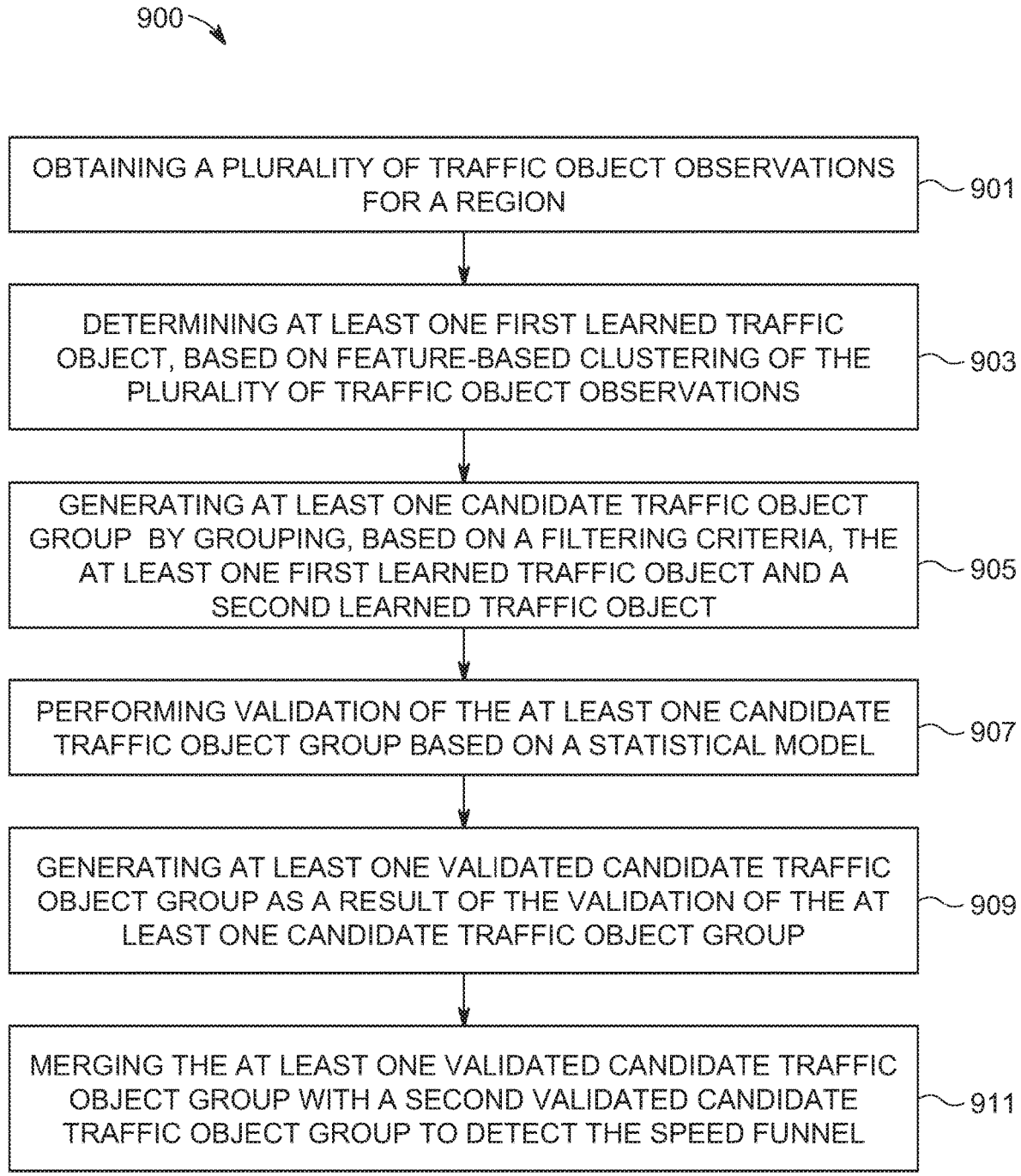

Having thus described example embodiments of the invention in general terms, reference will now be made to the accompanying drawings, which are not necessarily drawn to scale, and wherein:

FIG. 1 illustrates a schematic diagram of a network environment of a system for detecting a speed funnel in a region, in accordance with an example embodiment;

FIG. 2 illustrates a block diagram of the system for detecting the speed funnel in the region, in accordance with an example embodiment;

FIG. 3 illustrates an exemplary scenario of a working example of the system for detecting speed funnels in the region, in accordance with an example embodiment;

FIG. 4 illustrates an exemplary representation of traffic object observations, in accordance with an example embodiment;

FIG. 5 illustrates a schematic for extracting candidate traffic object from learned traffic objects, in accordance with an example embodiment;

FIG. 6 illustrates a schematic diagram of shape point locations of the link, in accordance with an example embodiment;

FIG. 7 illustrates a statistical model for performing validation of at least one candidate traffic object pair, in accordance with an example embodiment;

FIG. 8 illustrates an exemplary representation of data generated by the system, in accordance with an example embodiment; and FIG. 9 illustrates a flow diagram of a method for detecting a speed funnel in a region, in accordance with an example embodiment.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' may refer to (a) hardware-only circuit implementations (for example, implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (for example, volatile or non-volatile memory device), can be differentiated from a "computer-readable transmission medium," which refers to an electromagnetic signal.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Definitions

The term "link" may be used to refer to any connecting pathway including but not limited to a roadway, a highway, a freeway, an expressway, a lane, a street path, a road, an alley, a controlled access roadway, a free access roadway and the like.

The term "speed funnel" may be used to refer to a group of two or more speed signs indicating a change in sign values of speed signs from one end of the speed funnel to the other end of the speed funnel. A speed funnel may be used as an indication for a roadwork zone, an upcoming tunnel on a pathway, a transition from a highway to a ramp, entrance of a city, and the like.

The term "route" may be used to refer to a path from a source location to a destination location on any link.

End of Definitions

Embodiments of the present disclosure may provide a system, a method and a computer program product for detecting a speed funnel in a region. Roadwork zones are temporarily defined by authorities to take up road repair work of a section of the road or an entire road. In such cases, the authorities may merge the two lanes of a road, or divert a lane to a by-lane, etc. Such road work repairs are intimated to travelers in advance of actual commencement of the roadwork zone because such merging of the lanes may require reduction in speed of the vehicles to avoid collision or any mishap for autonomous vehicles. Thus, at least one speed funnel may usually precede the roadwork zone. Speed funnels may also indicate an upcoming travel zone, an upcoming tunnel on a pathway, or a transition from a highway to a ramp. In such scenarios, there is need to detect such speed funnels in a region such that the vehicles are decelerated before transitioning to the ramp from the highway, before entering the upcoming tunnel, or before changing the lane at which the road work is going on. These and other technical improvements of the invention will become evident from the description provided herein.

The system, the method, and the computer program product facilitating detection of a speed funnel in a region are described with reference to FIG. 1 to FIG. 9.

FIG. 1 illustrates a schematic diagram of a network environment 100 of a system 101 for detecting speed funnel in a region, in accordance with an example embodiment. The system 101 may be communicatively coupled to a mapping platform 103, a user equipment 105a and an OEM (Original Equipment Manufacturer) cloud 109 connected to a user equipment 105b, via a network 107. The components described in the network environment 100 may be further broken down into more than one component such as one or more sensors or application in user equipment and/or combined together in any suitable arrangement. Further, it is possible that one or more components may be rearranged, changed, added, and/or removed.

In an example embodiment, the system 101 may be embodied in one or more of several ways as per the required implementation. For example, the system 101 may be embodied as a cloud based service or a cloud based platform. As such, the system 101 may be configured to operate outside the user equipment 105a and/or 105b. However, in some example embodiments, the system 101 may be embodied within one or both of the user equipment 105a and the user equipment 105b, for example as a part of an in-vehicle navigation system. In each of such embodiments, the system 101 may be communicatively coupled to the components shown in FIG. 1 to carry out the desired operations and wherever required modifications may be possible within the scope of the present disclosure. The system 101 may be implemented in a vehicle, where the vehicle may be an autonomous vehicle, a semi-autonomous vehicle, or a manually driven vehicle. In an embodiment, the system 101 may be deployed in a consumer vehicle to detect the speed funnel in a region. Further, in one embodiment, the system 101 may be a standalone unit configured to detect the speed funnel in the region for the autonomous vehicle. Alternatively, the system 101 may be coupled with an external device such as the autonomous vehicle.

The mapping platform 103 may comprise a map database 103a for storing map data and a processing server 103b. The map database 103a may store traffic object observations. The traffic object observations may include sign type (such as a speed sign or a non-speed sign), a value of a sign if the sign type is a speed sign, location of the speed sign, travel direction and the heading of the speed sign. Further, the map database 103a may store node data, road segment data, link data, point of interest (POI) data, link identification information, heading value records, or the like. Also, the map database 103a further includes speed limit data of each lane, cartographic data, routing data, and/or maneuvering data. Additionally, the map database 103a may be updated dynamically to cumulate real time traffic conditions. The real time traffic conditions may be collected by analyzing the location transmitted to the mapping platform 103 by a large number of road users through the respective user devices of the road users. In one example, by calculating the speed of the road users along a length of road, the mapping platform 103 may generate a live traffic map, which is stored in the map database 103a in the form of real time traffic conditions. In one embodiment, the map database 103a may further store historical traffic data that includes travel times, average speeds and probe counts on each road or area at any given time of the day and any day of the year. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network used by vehicles such as cars, trucks, buses, motorcycles, and/or other entities. Optionally, the map database 103a may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 103a may also store data about the POIs and their respective locations in the POI records. The map database 103a may additionally store data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 103a may include event data (e.g., traffic incidents, construction activities, scheduled events, unscheduled events, accidents, diversions etc.) associated with the POI data records or other records of the map database 103a associated with the mapping platform 103. Optionally, the map database 103a may contain path segment and node data records or other data that may represent pedestrian paths or areas in addition to or instead of the autonomous vehicle road record data.

In some embodiments, the map database 103a may be a master map database stored in a format that facilitates updating, maintenance and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the user equipment 105a and/or 105b. The navigation-related functions may correspond to vehicle navigation, pedestrian navigation or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the map database 103a may be a master geographic database, but in alternate embodiments, the map database 103a may be embodied as a client-side map database and may represent a compiled navigation database that may be used in or with end user equipment such as the user equipment 105a and/or the user equipment 105b to provide navigation and/or map-related functions. For example, the map database 103a may be used with the user equipment 105a and/or the user equipment 105b to provide an end user with navigation features. In such a case, the map database 103a may be downloaded or stored locally (cached) on the user equipment 105a and/or the user equipment 105b.

The processing server 103b may comprise processing means and communication means. For example, the processing means may comprise one or more processors configured to process requests received from the user equipment 105a and/or the user equipment 105b. The processing means may fetch map data from the map database 103a and transmit the same to the user equipment 105b via OEM cloud 109 in a format suitable for use by the one or both of the user equipment 105a and/or the user equipment 105b. In one or more example embodiments, the mapping platform 103 may periodically communicate with the user equipment 105a and/or the user equipment 105b via the processing server 103b to update a local cache of the map data stored on the user equipment 105a and/or the user equipment 105b. Accordingly, in some example embodiments, the map data may also be stored on the user equipment 105a and/or the user equipment 105b and may be updated based on periodic communication with the mapping platform 103.

In some example embodiments, the user equipment 105a and the user equipment 105b (hereinafter, also referred to as "the user equipment 105a, 105b") may be any user accessible device such as a mobile phone, a smartphone, a portable computer, and the like that are portable in themselves or as a part of another portable/mobile object such as a vehicle. The user equipment 105a, 105b may comprise a processor, a memory and a communication interface. The processor, the memory and the communication interface may be communicatively coupled to each other. In some example embodiments, the user equipment 105a, 105b may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example embodiments, the user equipment 105a, 105b may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the user equipment 105a, 105b. Additional, different, or fewer components may be provided. For example, the user equipment 105a, 105b may be configured to execute and run mobile applications such as a messaging application, a browser application, a navigation application, and the like. In one embodiment, at least one user equipment such as the user equipment 105b may be directly coupled to the system 101 via the network 107. For example, the user equipment 105b may be a dedicated vehicle (or a part thereof) for gathering data for development of the map data in the map database 103a. In some example embodiments, at least one user equipment such as the user equipment 105b may be coupled to the system 101 via the OEM cloud 109 and the network 107. For example, the user equipment 105b may be a consumer vehicle (or a part thereof) and may be a beneficiary of the services provided by the system 101. In some example embodiments, one or more of the user equipment 105a and 105b may serve the dual purpose of a data gatherer and a beneficiary device. The user equipment 105a or 105b may be configured to capture sensor data associated with a road which the user equipment 105a, 105b may be traversing. The sensor data may for example be image data of road objects, road signs, or the surroundings (for example buildings). The sensor data may refer to sensor data collected from a sensor unit in the user equipment 105a and/or user equipment 105b. In accordance with an embodiment, the sensor data may refer to the data captured by the vehicle using sensors.

The network 107 may be wired, wireless, or any combination of wired and wireless communication networks, such as cellular, Wi-Fi, internet, local area networks, or the like. In one embodiment, the network 107 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. In an embodiment the network 107 is coupled directly or indirectly to the user equipment 105b via OEM cloud 109. In an example embodiment, the system may be integrated in the user equipment 105b. In an example, the mapping platform 103 may be integrated into a single platform to provide a suite of mapping and navigation related applications for OEM devices, such as the user devices and the system 101. The system 101 may be configured to communicate with the mapping platform 103 over the network 107. Thus, the mapping platform 103 may enable provision of cloud-based services for the system 101, such as, storing the lane marking observations in the OEM cloud 109 in batches or in real-time.

FIG. 2 illustrates a block diagram of the system 101 for detecting the speed funnel in the region, in accordance with an example embodiment. The system 101 may include a processing means such as at least one processor 201 (hereinafter, also referred to as "processor 201"), storage means such as at least one memory 203 (hereinafter, also referred to as "memory 203"), and a communication means such as at least one communication interface 205 (hereinafter, also referred to as "communication interface 205"). The processor 201 may retrieve computer program code instructions that may be stored in the memory 203 for execution of the computer program code instructions.

The processor 201 may be embodied in a number of different ways. For example, the processor 201 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 201 may include one or more processing cores configured to perform independently. A multi-core processor may enable multiprocessing within a single physical package. Additionally, or alternatively, the processor 201 may include one or more processors configured in tandem via the bus to enable independent execution of instructions, pipelining and/or multithreading.

In some embodiments, the processor 201 may be configured to provide Internet-of-Things (IoT) related capabilities to users of the system 101, where the users may be a traveler, a rider, a pedestrian, and the like. In some embodiments, the users may be or correspond to an autonomous or a semi-autonomous vehicle. The IoT related capabilities may in turn be used to provide smart navigation solutions by providing real time updates to the users to take pro-active decision on turn-maneuvers, lane changes, overtaking, merging and the like, big data analysis, and sensor-based data collection by using the cloud based mapping system for providing navigation recommendation services to the users. The system 101 may be accessed using the communication interface 205. The communication interface 205 may provide an interface for accessing various features and data stored in the system 101.

Additionally, or alternatively, the processor 201 may include one or more processors capable of processing large volumes of workloads and operations to provide support for big data analysis. In an example embodiment, the processor 201 may be in communication with the memory 203 via a bus for passing information among components coupled to the system 101.

The memory 203 may be non-transitory and may include, for example, one or more volatile and/or non-volatile memories. In other words, for example, the memory 203 may be an electronic storage device (for example, a computer readable storage medium) comprising gates configured to store data (for example, bits) that may be retrievable by a machine (for example, a computing device like the processor 201). The memory 203 may be configured to store information, data, content, applications, instructions, or the like, for enabling the apparatus to carry out various functions in accordance with an example embodiment of the present invention. For example, the memory 203 may be configured to buffer input data for processing by the processor 201. As exemplarily illustrated in FIG. 2, the memory 203 may be configured to store instructions for execution by the processor 201. As such, whether configured by hardware or software methods, or by a combination thereof, the processor 201 may represent an entity (for example, physically embodied in circuitry) capable of performing operations according to an embodiment of the present invention while configured accordingly. Thus, for example, when the processor 201 is embodied as an ASIC, FPGA or the like, the processor 201 may be specifically configured hardware for conducting the operations described herein. Alternatively, as another example, when the processor 201 is embodied as an executor of software instructions, the instructions may specifically configure the processor 201 to perform the algorithms and/or operations described herein when the instructions are executed. However, in some cases, the processor 201 may be a processor specific device (for example, a mobile terminal or a fixed computing device) configured to employ an embodiment of the present invention by further configuration of the processor 201 by instructions for performing the algorithms and/or operations described herein. The processor 201 may include, among other things, a clock, an arithmetic logic unit (ALU) and logic gates configured to support operation of the processor 201.

The communication interface 205 may comprise input interface and output interface for supporting communications to and from the user equipment 105a, 105b or any other component with which the system 101 may communicate. The communication interface 205 may be any means such as a device or circuitry embodied in either hardware or a combination of hardware and software that is configured to receive and/or transmit data to/from a communications device in communication with the user equipment 105a, 105b. In this regard, the communication interface 205 may include, for example, an antenna (or multiple antennae) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

The communication interface 205 may comprise input interface and output interface for supporting communications to and from the user equipment 105a, 105b or any other component with which the system 101 may communicate. The communication interface 205 may be any means such as a device or circuitry embodied in either hardware or a combination of hardware and software that is configured to receive and/or transmit data to/from a communications device in communication with the user equipment 105a, 105b. In this regard, the communication interface 205 may include, for example, an antenna (or multiple antenna) and supporting hardware and/or software for enabling communications with a wireless communication network. Additionally, or alternatively, the communication interface 205 may include the circuitry for interacting with the antenna(s) to cause transmission of signals via the antenna(s) or to handle receipt of signals received via the antenna(s). In some environments, the communication interface 205 may alternatively or additionally support wired communication. As such, for example, the communication interface 205 may include a communication modem and/or other hardware and/or software for supporting communication via cable, digital subscriber line (DSL), universal serial bus (USB) or other mechanisms.

FIG. 3 illustrates an exemplary scenario 300 of a working environment of the system 101 for detecting speed funnels in the region, in accordance with an example embodiment. A vehicle 301 (such as the user equipment 105a as illustrated in FIG. 1, hereinafter, the vehicle 301 is same as user equipment 105a) may be travelling on a road 303 on which one or more speed signs 305 may be posted. In some example embodiments, the one or more speed signs may include a speed sign 305a, a speed sign 305b, a speed sign 305c, and a speed sign 305d which are consecutive speed signs and represent a speed funnel. In some example embodiments, a speed funnel may be an indication of a roadwork zone corresponding to an entrance of a city via the road 303, a road work going on the road 303, a transition from a highway (i.e., the road 303) to a local road, or any other activity going on the road 303 that may require a driver of the vehicle 301 to decelerate the vehicle 301.

According to one example embodiment, a vehicle 301 may request for a route between the source location and the destination location from the mapping platform 103, where the road 303 may be a part of the requested route. In an embodiment, the road 303 may encompass the roadwork zone in some region and it is important to indicate the vehicle 301 about the roadwork zone and speed funnels ahead of the roadworks. Similarly, in an example embodiment, the road 303 may be part of the route that is entering a city through ramps; therefore, it is necessary to indicate the vehicle 301 that freeway is about to end and city road is about to start. Hence, it is important to notify the vehicle 301 about the major change of road conditions and traffic state associated with the road 303 on which the vehicle 301 is traversing. Along with this, the speed funnels associated with this road 303 should be notified to the vehicle 301 to achieve accurate navigation assistance.

In some example embodiments, the system 101 may provide measures for detecting the speed funnels in a region. Alternately, the system 101 may be invoked on demand or routinely to detect the speed funnels for speed signs (e.g., the speed sign 305*a*, the speed sign 305*b*, the speed sign 305*c*, and the speed sign 305*d*) that have already been learnt and thereby update the map data of speed signs for which the speed funnels exists. In some example embodiments, the system 101 may be invoked when an end user equipment may request a route between two locations. The mapping platform 103 may determine the links encompassed by the route and their corresponding speed signs and thereafter invoke the system 101 to detect the speed funnels associated with the route. In this way, the mapping platform 103 and/or the end user equipment may be informed of the links for which the speed funnels exist. Irrespective of the manner in which the system 101 is triggered, the system 101 may provide measures for detecting speed funnels.

On being triggered, the system 101 may obtain a plurality of traffic object observations in the region associated with the road 303 from the OEM cloud 109 over the network 107. The traffic object observations may include observations associated with one or more traffic objects on the roads (e.g., the road 303) such as one or more vehicles (e.g., the vehicle 301), one or more pedestrians, one or more road signs, trees, building, roads, and any object present on the roads. In some example embodiments, the traffic object observations may comprise one or more road sign type (such as a speed sign or a non-speed signs), a value of a road sign if the sign type is the speed sign, links associated with respective speed signs, a location of the respective speed signs, driving direction of the links associated with speed signs.

In some example embodiment, the traffic object observations may refer to sensor data collected from a plurality of vehicles (e.g., the vehicle 301, and/or other vehicles which have traversed the road 303), that is, the one or more sensors installed in the vehicles. Such traffic observations may indicate the traffic objects as learned traffic objects which may be learned by the one or more sensors. In one example embodiment, the traffic object observations may include speed sign observations that comprise a time of capture of the speed signs from the plurality of vehicles which have already traversed the road 303. The plurality of vehicles passing by the location of each of the speed sign on the pathway, generate a plurality of speed sign observations for each of the speed signs (e.g., each of the speed sign 305*a*, the speed sign 305*b*, the speed sign 305*c*, and the speed sign 305*d*). Therefore, each traffic object observation is different from other traffic object observation based on location data, heading data, driving direction, speed sign value, and time of capture of the speed sign from a vehicle. In an example embodiment, the system 101 collects traffic object observations of speed signs as input data.

FIG. 4 illustrates an exemplary representation of traffic object observations 400, in accordance with an example embodiment. The traffic object observations may include traffic object observation ID 401, sign type 403, sign value 405, link data 407, location data 409, and the driving direction 411. The sign type 403 may be a speed sign, or a non-speed sign, or a conditional sign, or the like. The sign value 405 is the value associated with the sign type 403, if the sign type 403 is a speed sign. The link data 407 is the data or information associated with link associated with the traffic object (e.g. sign). The location data 409 is the data associated with the location of the traffic sign or the traffic object observation. The driving direction 411 is the direction along which vehicles on the link associated with traffic object travel. It may be contemplated that the traffic object observations may include fewer or more parameters than those described in FIG. 4. Having obtained the traffic object observations, the system 101 transforms, process, and execute the input data to generate learned speed signs as learned traffic objects by clustering the traffic object observations based on more of more features.

In some example embodiments, the system 101 may determine a first learned traffic object from the plurality of traffic object observations 400. The determination of the first learned traffic object such as a learned speed sign may be based on a feature-based clustering of the plurality of traffic object observations. Further, the determination of the first learned traffic object is based on one or more criterion. The one or more criterion may correspond to the location data 409 comprising location of the speed signs and the driving direction 411 of the links associated with that speed signs. The system 101 may cluster the traffic object observations 400 based on the location data 409 and the driving direction 411. The system 101 may determine a cluster (also called as a first cluster) of traffic object observations 400 based on a location criteria. To that end, the system 101 collects traffic object observations 400 from the plurality of vehicles which have already traversed a particular location, where the traffic object observations 400 may include at least the speed signs at different locations in a geographic area. Further, the system 101 may collect all the speed signs in a particular threshold location (a region within the geographic area, such as the road 303) in a first clustering step. The system 101 may further determine the second cluster from the first cluster of the traffic object observations based on a direction criteria. To that end, the system 101 may cluster the observation in the particular threshold location, based on driving direction 411. In the second cluster all speed signs in same driving direction 411 are included in the second clustering step. Therefore, the second cluster includes the traffic object observations 400 that satisfy condition of both the location and the same driving direction.

The system 101 may cluster the traffic object observations 400 based on the feature-based clustering using a clustering algorithm. Examples of the clustering algorithms may include, but are not limited to, partition-based clustering, hierarchical clustering, fuzzy clustering, density-based clustering, model-based clustering, and the like. In an example embodiment, the clustering algorithm may be the density-based clustering such as a Density-based spatial clustering of applications with noise (DBSCAN) algorithm. The DBSCAN algorithm is a density-based clustering non-parametric algorithm: given a set of points in some space, groups together points that are closely packed together (points with many nearby neighbors), marking as outliers points that lie alone in low-density regions (whose nearest neighbors are too far away). The DBSCAN algorithm requires two parameters such as a local radius for expanding a cluster as "C" (eps) and a minimum number of points required to form a dense region as "minPts". The clustering starts with an arbitrary starting point that has not been visited and the point's F-neighborhood is retrieved, and if it contains sufficiently many points, a cluster is started.

In particular, the system 101 utilizes the location data 409 to cluster the traffic object observations 400 based on the DBSCAN algorithm. To that end, the minPts of the DBSCAN algorithm may be set to 5 and the eps of the DBSCAN algorithm may be set to 15 meters for executing location-based clustering. In another example embodiment, the DBSCAN algorithm on the direction data to cluster the traffic object observations 400 and the minPts of the DBSCAN algorithm may be set to 5 and the eps of the DBSCAN algorithm may be set to 30 degrees for direction-based clustering. The minPts may depend on vehicle density and GPS accuracy and as such can be configured to any desired value. The system 101 may execute the DBSCAN algorithm using the speed sign observations, in two or more steps in accordance with set values of the eps and the minPts. In first step, the DBSCAN algorithm is executed on latitude and longitude of the speed sign observations which have same speed limit values (road signs having similar values). Further, the DBSCAN algorithm is executed in a second step on the driving direction in the same location cluster i.e. the first cluster such that second cluster is obtained from the first cluster.

Further, the system 101 may compute an average location parameter value and an average direction parameter value for the second cluster of the traffic object observations 400. To that end, the system 101 may extract a centroid of the second cluster to approximate the true location and driving direction of a road sign (e.g., one of the speed sign 305a, the speed sign 305b, the speed sign 305c, and the speed sign 305d). The average location parameter value and the average direction parameter value may correspond to at least one first learned traffic object. In an example embodiment, the at least one first learned traffic object may further be used for extracting candidates of speed funnel formed by grouping nearby learned traffic objects. In an embodiment, the first learned traffic object may be grouped with one or more traffic objects and as such a group of traffic objects may include two or more than two traffic objects. In some example embodiments, in order to reduce the computing time, the first learned traffic object may be grouped with only one traffic object. For the sake of convenience henceforth the description of grouping has been described by considering the group as a pair of two traffic objects (hereinafter, "traffic object pair). However, this should in no way be considered limiting and it may be contemplated that in a similar manner as pairing of two learned traffic objects, the grouping can be performed for more than two learned traffic objects as well. Further, the traffic object pair from a plurality of learned traffic objects is based on one or more filtering criterion, a detailed description of which is provided next with reference to FIG. 5 to extract the candidates of speed funnel formed by two nearby learned signs.

FIG. 5 illustrates a schematic 500 for extracting a candidate traffic object from the learned traffic objects, in accordance with an example embodiment. The system 101 may extract a candidate traffic object from the learned traffic objects based on one or more filtering criterion. In an example embodiment, consider a learned traffic object 50 as the first learned traffic object and the first learned traffic object 50 is a speed sign which has a sign value of 50 km/hr, a heading of 90 degrees, and is a sign type indicating a speed limit start. For one of the learned traffic objects to be a traffic object for a candidate traffic object pair along with the first learned traffic object 50, the system 101 may filter the learned traffic objects to determine a qualified learned traffic object in each filtering step.

According to the first filtering criterion (also referred as a first condition) at step 501, the system 101 may calculate the Euclidean distance between the first learned traffic object 50 and a second learned traffic object that is each learned traffic object from the learned traffic objects. Based on the calculation, the system 101 determines the qualified learned traffic objects within a distance threshold range (i.e., a combination of a first threshold distance and a second threshold distance) to be a candidate traffic object pair. In particular, a distance between the at least one first learned traffic object and the second learned traffic object is greater than the first threshold distance and less than the second threshold distance, in the first condition. In an example embodiment, the distance threshold may be between 30 meters and 1000 meters from the first learned traffic object 50. In particular, the learned traffic objects lying within a radius greater than 30 meters and less than 1000 meters from the first learned traffic object 50 are determined to be qualified learned traffic objects or distance filtered learned traffic objects. Therefore, the system 101 generates the candidate traffic object pairs based on the first filtering criterion.

Further, according to a second filtering criterion (also referred as a second condition) at step 503, the system 101 may determine the candidate traffic object pair based on a driving direction filtering. The system 101 determines that an angle between a driving direction of the at least one first learned traffic object and a driving direction of the second learned traffic object is less than a threshold angle, where the second learned traffic object may correspond to each of the qualified candidate traffic objects. In particular, the second learned traffic object may be qualified as the candidate traffic objects if the heading difference of first learned traffic object and the second learned traffic object is between 40 degrees and 320 degrees, and accordingly, the system 101 generates the candidate traffic object pairs. The system 101 may obtain the heading of each of the first learned traffic object and the second learned traffic object from the traffic object observations According to the third filtering criterion (also referred as a third condition) at step 505, the system 101 may further determine the candidate traffic object pairs based on a sight filtering criterion. To that end, the system 101 may determine qualified candidate traffic objects by applying a sight criteria. In such a case, the system 101 may determine a difference between driving directions of each of the candidate traffic object pairs obtained from the second filtering criterion. In particular, the system 101 may determine a difference between the first learned traffic object and the second learned traffic object of each candidate traffic object pairs, where the second learned traffic object may correspond to each object of the qualified candidate traffic objects determined in the second filtering criterion. Further, the system 101 may determine candidate traffic object pairs from the candidate traffic object pairs obtained from the second filtering criterion, if the determined difference is equal to or less than a threshold value. Further, the sight criteria may also indicate that the first learned traffic object may be associated with a value being higher than a value of the second learned traffic object, and the second learned traffic object having a smaller value may be is in the downstream part of a larger value sign (i.e., the first learned sign).

According to the fourth filtering criterion (also referred as a fourth condition) at step 507, the system 101 may determine candidate traffic object pairs based on a speed value filtering. The system 101 may determine if the difference between a speed value associated with the at least one first learned traffic object and a speed value associated with the second learned traffic object is less than a threshold speed value. The system 101 may further determine the at least one first learned traffic object and the second learned traffic object as a candidate traffic object pair if such a criterion is satisfied. In an example embodiment, if the first learned sign is 50 km/hr and the second learned sign is 10 km/hr or 60 km/hr, the fourth criterion is not satisfied, and the candidate traffic object pair is not formed. Similarly, the first learned sign is 50 km/hr and the second learned sign is 40 km/hr or 30 km/hr, the fourth criterion is satisfied, and the candidate traffic object pair is formed. Thus, the candidate traffic object pairs are (50, 40), and (50, 30). The system 101 may generate candidate traffic object pair even if one criterion of the first filtering criterion, the second filtering criterion, the third filtering criterion, and the fourth filtering criterion is true, but the precision of the data increases in case all criterions are true. In an example embodiment, the at least one candidate traffic object pair may further be used for determining map matched link data associated with each learned traffic object in the at least one candidate traffic object pair based on map data of the region, a detailed description of which is provided next with reference to FIG. 6.

FIG. 6 illustrates a schematic diagram 600 of shape point locations of the link associated with the learned traffic object or speed sign, in accordance with an example embodiment. In some example embodiments, the system 101 may determine map matched link data associated with each learned traffic object in the at least one candidate traffic object pair, based on map data of the region.

In an example embodiment, one or more link attributes of the link (hereinafter, the road 303 may also be called as "a link 303") may be used for determining heading or driving direction of the link 303, in accordance with an example embodiment. The link 303 may start from a start node 601 and terminate at an end node 603. Further, the link 303 may have corresponding shape point locations 605a, 605b, 605c, and 605d. An upstream heading/driving direction (u) of the link 303 may be the heading of the start node 601 of the link 303, measured as the heading of the vector formed by the start node 601 and the nearest shape point location i.e. 605a. Similarly, the downstream heading/driving direction (v) may be the heading of the end node 603 of the link 303, measured as the heading of the vector formed by the nearest shape point location 605d of the end node 603 and the end node 603.

The system 101 uses both the location and driving direction to approximate the probability of the map-matched links for a learned speed sign as shown in Equation (1).

$$P(\alpha \mid t_i) = P^\theta(\alpha \mid t_i) \cdot P^\eta(\alpha \mid t_i) \quad (1)$$

$$P^\eta(\alpha \mid t_i) = \int_{\|t_i,\eta\|-\Delta^\eta}^{\|t_i,\eta\|+\Delta^\eta} \left(\frac{1}{\sqrt{2\pi}} e^{-\frac{x}{2(\Delta^\eta)^2}}\right) dx$$

$$P^\theta(\alpha \mid t_i) = \int_{\|t_i,\theta\|-\Delta^\theta}^{\|t_i,\theta\|+\Delta^\theta} \left(\frac{1}{\sqrt{2\pi}} e^{-\frac{x}{2(\Delta^\theta)^2}}\right) dx$$

In Eq. 1, $P^\eta(\alpha|t_i)$ estimates the likelihood of matching the learned sign $\alpha$ on the link $t_i$ as to the driving direction, respectively. In $P^\eta(\alpha|t_i)$, $\|t_i, \eta\|$ calculates the absolute driving direction difference between the sign and map-matched location on that link. The system 101 determines the tolerance value $\Delta^\eta$, whose start value is set to be one degree. In an example embodiment, if the sign is on the same driving direction as the map-matched link, $P^\eta(\alpha|t_i)$ will be as high as a maximum value of 0.67 and if the sign is on the opposite driving direction as a map link, the percentage value will be small enough so that the sign will not match with that link. In $P^\theta(t|a)$, $\|t_i, \theta\|$ calculates the minimum distance from the learned sign to the link t based on the link start node, end node, shape locations, as well as the learned sign location: $\|t_i, \theta\|$ equals to the point-to-line distance if the sign is right above the link; otherwise, it equals the Euclidean distance from sign to start or end node. $\Delta^\theta$ is the distance tolerance, whose start value is set to be six meters. In an example embodiment, the correct map-matched link should not be far away from the learned traffic object. Thus, the system 101 computes the map-matching probability for the links only within a distance threshold value (e.g., 150 meters). In an example embodiment, the at least one candidate traffic object pair may further be used for determining the one or more transition probability values based on the map matched link data associated with respective learned traffic object of the at least one candidate traffic object pair, a detailed description of which is provided next with reference to FIG. 7.

FIG. 7 illustrates a statistical model 700 for performing validation of the at least one candidate traffic object pair, in accordance with an example embodiment. The system 101 may determine a connecting probability value between the at least one first learned traffic object and the second learned traffic object in the at least one candidate traffic object pair based on the one or more transition probability values associated with the statistical model 700. In an example embodiment, the statistical model 700 may be a statistical markov model (such as a Hidden Markov model). The term "Hidden Markov model" may be a probabilistic graphical model to predict a sequence of unknown hidden variables from a set of observed variables. The Markov model may be a stochastic model used to model randomly changing systems. The hidden markov model may be a statistical markov model in which a system (e.g., the system 101) being modeled may be associated with a sequence of possible events in which a probability of each event depends only on a state attained in a previous event.

In an example embodiment, the map-matched links of two learned traffic objects may not be connected and there is a sequence of connecting links in between. In the statistical model 700, the system 101 models the state as a set of links within a distance threshold to the first learned sign (i.e., a larger value sign) in Eq. 2. In an example embodiment, the distance threshold value is set at 1000 meters, which is similar to value in distance filtering.

$$S=[t_1, t_2, \ldots, t_i, \ldots, t_N] \quad 2)$$

The system 101 may determine downstream connecting links from an existing upstream link in "one phase". In FIG. 7, the system 101 may assume that there are at least M connecting links between two learned signs, accordingly there may be M phases. A value of number "M" may be as large as the total number of links in the state S, which builds up heavy but unnecessary workloads. To solve this problem, in statistical model 700, the number M may be determined based on the number of connecting links given a distance radius. In an example embodiment, the distance radius is 50 meters. Based on a realization that the speed funnel usually appears on high-speed roads such as freeway or arterials, a long distance is required for a change in geographic or traffic state change to occur. Therefore, the system 101 may set the number of connecting links in the hidden state as a static number of twenty which can sufficiently cover most candidates.

Further, the system 101 may characterize the state in each phase by a probabilistic approach using the statistical model 700. The emission probability for two learned traffic objects in the candidate is defined as the probability of the map-matched links: the larger-value sign is defined as $S^1$ while the smaller-value sign is as $S^M$. In Eq. 3, $t_{i1}$ represents the ith link in Phase 1, $\alpha_1$ represents the larger-value learned sign, and $\alpha_2$ represents the smaller-value learned sign in the candidate.

$$P^1(t_{i1}) = P(\alpha_1 | t_{i1})$$

$$P^M(t_{iM}) = P(\alpha_2 | t_{iM}) \qquad (3)$$

In the statistical model 700, the transition between phases also follows a probabilistic approach and a certain connecting probability. The statistical model 700 further determines the connecting probability based on a function of the one or more transition probability values. The one or more transition probability values may include one or more of a first transition probability, a second transition probability, or a third transition probability. The first transition probability value is associated with a connectivity feature of the map-matched link data associated with respective learned traffic object in the at least one candidate traffic object pair. The system 101 may measure the connectivity between links using the statistical model 700. The system 101 may assume that the transition between each phase in connectivity is predefined in the map and the transition is independent of each other. The statistical model 700 may define two links as connected if probability is equal to 1 and disconnected if probability is equal to 0. In Eq. 4, $P^c(t_j|t_{(j-1)})$ denotes the connectivity transition probability from a link (state) in (j−1)th phase to a link in the jth phase. The probability allows the transition within the same link by setting the condition ($p_j = q_{j-1}$ or $p_j = p_{j-1}$). This is to retain the route whose number of connecting links is smaller than M (maximum number of connecting links) by giving a high connectivity transition probability for that route.

$$P^c(t_j | t_1) = \qquad (4)$$

$$P^c(t_j | t_{(j-1)})P^c(t_{(j-1)} | t_{(j-2)}) \ldots \ldots P^c(t_2 | t_1) = \prod_2^j P^c(t_x | t_{(x-1)})$$

$$\text{where } P^c(t_j | t_{(j-1)}) = \begin{cases} 1 & p_j = q_{j-1} \text{ or } p_j = p_{j-1} \\ 0 & p_j \neq q_{j-1} \text{ and } p_j \neq p_{j-1} \end{cases}$$

The second transition probability value may be associated with a driving direction change feature of the map-matched link data associated with each learned traffic object in the at least one candidate traffic object pair. The second transition probability may be measured based on the driving direction change between two connecting links (two phases). Based on a realization that the signs in the speed funnel usually have similar driving direction, their map-matched links and connecting links in between may also have similar driving direction (if not, the vehicles are driving on the curvature road and don't need a speed funnel to alert deceleration). The transition probability employs the exponential function and it is used to maximize the probability with smallest driving direction change. In Eq. 5, $P^H(t_{(j-1)}|t_{(j-2)})$ denotes the driving direction transition probability from a link(state) in (j−1)th phase to a link in the jth phase. β is a parameter to resemble the largest driving direction change in the speed funnel. In an example embodiment, the value is set to be 40 degrees.

$$P^H(t_j | t_1) = \qquad (5)$$

$$P^H(t_j | t_{(j-1)})P^H(t_{(j-1)} | t_{(j-2)}) \ldots \ldots P^H(t_2 | t_1) = \frac{1}{\beta} e^{-\frac{\sum_2^j |u^{x-1} - u^x|}{\beta}}$$

Further, the third transition probability value may be associated with an on route distance between the at least one first learned traffic object and the second learned traffic object in the at least one candidate traffic object pair. The third transition probability may be measured based on the on-route total distance between the two learned signs in the candidate. The distance between signs in the speed funnel may not be either too long or too short so that the deceleration is both safe and comfortable. In Eq. 6, $P^D(t_j|t_1)$ denotes the distance transition probability from a link(state) in (j−1)th phase to a link in the jth phase. ∃(j) denotes total unique links from phase 1 to phase j. This notation may prevent duplicate distance addition because of the transition within the same link. In an example embodiment, $d^1$ and $d^2$ are the maximum and minimum distance threshold setting to be 1000 and 30 meters or can be slightly longer because on-route distance may be usually larger than Euclidean distance.

$$P^D(t_j | t_1) = \begin{cases} 1 & d^2 \leq \sum_1^{\exists(j)} l^x \leq d^1 \\ 0 & \sum_1^{\exists(j)} l^x < d^2 \text{ or } \sum_1^{\exists(j)} l^x > d^1 \end{cases} \qquad (6)$$

Based on the emission probability and the transition probability, all sets of the connecting links in the candidate may be extracted. In an embodiment, the candidates that have connecting links with $P^1(t_1)P^c(t_M|t_1)P^H(t_M|t_1)P^D(t_M|t_1)P^M(t_{iM}) \neq 0$ may be proved to connect to a true route and may be taken as the true candidate. In some example embodiments, the candidate may be connected to more than one true routes (turnout or service center on freeway). In such a case, the route with larger probability may be a more likely one for the candidate.

In an example embodiment, the at least one validated candidate traffic object pair may be merged with a second validated traffic object pair to detect the speed funnel. The system 101 may merge the at least one validated traffic object pair with the second validated traffic object pair after validating the route between them. The merging of the validated traffic objects with each other constitutes the speed funnel. To that end, the system 101 may filter traffic objects in the at least one validated candidate traffic object pair and the second validated traffic object pair based on a distance criteria to obtain a set of filtered traffic objects based on a distance criteria to obtain a set of filtered traffic objects. Further, the system 101 may determine a parameter value associated with each traffic object in the set of filtered traffic objects, and merge the at least one validated candidate traffic object pair and the second validated traffic object pair, based on the parameter value associated with each traffic object in the set of filtered traffic objects. For instance, if two funnel candidates have the same start or end learned signs, the system 101 may remove the one whose Euclidean distance between signs is larger. In another example embodiment, if a smaller-value learned sign in one funnel is the same as a larger-value learned sign in the second funnel, the system 101 may merge those two funnels.

In an example embodiment, if two consecutive learned signs in the speed funnels may have the same speed value, then the system 101 may merge the speed funnels such that the consecutive signs are arranged one after another, for example 120→100→100→80. To avoid these situations, the system 101 may perform validation method using statistical model 700 and connect the two candidates if the two identical-value learned signs are on the same route. After the filtering and merging, the system 101 may detect the speed funnels which consist of two or more than two sign values.

FIG. 8 illustrates an exemplary representation of data 800 generated by the system 101, in accordance with an example embodiment. The system 101 may obtain plurality of traffic object observations 400. The first column shows speed value of all the traffic observations (such as 50 Km/hr, 10 Km/hr, 40 Km/hr, 30 Km/hr and 60 Km/hr). The second column shows the location data 409 of all the traffic object observations 400. The third column shows the driving direction 411 of all the traffic object observations 400. The fourth column shows if the traffic object observations satisfy the third and fourth filtering conditions or not. The fifth column shows if the route between the traffic object observations is validated or not. The system performs this validation using the statistical model (for example, the HMM model). The last column shows the merging of traffic object observations and formation of speed funnel. In the second column, the system 101 may determine the first cluster of the traffic object observations based on the first filtering criterion (i.e., the location criterion), Therefore, all the traffic object observations within a region form the first cluster. Further, the system 101 may determine the second cluster from the first cluster of the traffic object observations, based on direction criteria. Therefore, all the traffic object observations in the first cluster which fall in category of same driving direction form the second cluster.

Further, the system 101 may generate at least one candidate traffic object pair by pairing, based on filtering criteria (i.e., the third filtering criterion and the fourth filtering criterion). For example, the system 101 may discard the speed sign 60 Km/hr as it is not satisfying the fourth filtering criteria as explained in FIG. 5. The system 101 may validate the route for all the links associated with the speed signs which satisfies the filtering criteria. After validating the routes associated with the speed signs by the statistical model 700, the system 101 may merge the links to achieve a speed funnel as described above in FIG. 7. Further, the system 101 may update the map data of the region based on the detected speed funnel. In some example embodiment, the system 101 may detect an upcoming travel zone, an upcoming tunnel, a transition from highway to a local road, or an entrance of a city based on the detected speed funnel. The upcoming travel zone may comprise one or more of a roadwork zone, a city start location, a tunnel, a bridge, a road curvature region, or a freeway merging zone. Further, the system 101 may send a notification to one or more vehicles (e.g., the vehicle 301) about the upcoming travel zone, the upcoming tunnel, the transition from highway to the local road, or the entrance of the city. In some example embodiments, the notification may comprise an instruction to adjust a vehicle speed. In particular, the adjustment of the vehicle speed comprises decelerating the one or more vehicles (e.g., the vehicle 301) within a threshold distance from start of a detected entity (e.g., the upcoming travel zone).

FIG. 9 illustrates a flow diagram of a method 900 for detecting the speed funnel in the region, in accordance with an example embodiment. It will be understood that each block of the flow diagram of the method 900 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 203 of the system 101, employing an embodiment of the present invention and executed by a processor 201. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions. The method 900 illustrated by the flowchart diagram of FIG. 9 is for detecting a speed funnel in a region. Fewer, more, or different steps may be provided.

At step 901, the method comprises obtaining a plurality of traffic object observations for a region. The system 101 may obtain the plurality of observations for the region. The traffic object observations comprise one or more speed signs, values of the respective speed signs, location and driving direction associated with the respective speed signs. The plurality of traffic object observations are observed by plurality of vehicles traversed a particular speed sign.

At step 903, the method comprises determining at least one first learned traffic object based on feature-based clustering of the plurality of traffic object observations. The system 101 clusters the plurality of traffic object observations based on a location criterion and a driving direction criterion using a clustering algorithm. Further, the system 101 determines a centroid of the plurality of traffic object observations in the cluster to determine the at least one first learned traffic object.

At step 905, the method comprises generating at least one candidate traffic object group by grouping the at least one first learned traffic object and a second learned traffic object based on a filtering criteria. The system 101 may execute the filtering criteria, where the filtering criteria comprises one or more of a first condition that a distance between the at least one first learned traffic object and the second learned traffic object is greater than a first threshold distance and less than a second threshold distance. The second condition may indicate that an angle between a driving direction of the at least one first learned traffic object and a second driving direction of the second learned traffic object is less than a threshold angle. The third condition that the at least one first learned traffic object and the second learned traffic object satisfy the sight criteria and the fourth condition that a difference between a speed value associated with the at least one first learned traffic object and a second speed value associated with the second learned traffic object is less than a threshold speed value.

At step 907, the method comprises performing validation of the at least one candidate traffic object group based on a statistical model. The system 101 may utilize the statistical model 700 (such as the hidden markov model) to validate the at least one candidate traffic object group. Towards this objective, the method may further comprise determining map matched link data associated with each learned traffic object in the at least one candidate traffic object group based on map data of the region, determining a connecting probability value between the at least one first learned traffic object and the second learned traffic object in the at least one candidate traffic object group based on one or more transition probability values associated with the statistical model, and performing validation of the at least one candidate traffic object group based on the connecting probability value.

At step 909, the method comprises generating at least one validated candidate traffic object group as a result of the validation of the at least one candidate traffic object group. The system 101 may generate the at least one traffic object group based on the result of the validation of the at least one candidate traffic object group. The at least one validated candidate traffic object group may comprise a group of traffic objects connected by a true route.

At step 911, the method comprises merging the at least one validated candidate traffic object group with a second validated candidate traffic object group to detect the speed funnel. If two validated candidate groups have same start or end learned traffic objects, the system 101 discards the candidate group with larger Euclidean distance between them. The system 101 merges two validated candidate groups if the smaller value learned traffic object in one validated candidate group is same as the larger value learned traffic object in other validated candidate group. The merged two or more validated candidate traffic object comprises the speed funnel. The method further comprises updating the map data of the region based on the detected speed funnel. For example, the map data of the region may be updated to indicate the speed funnel so that a user of the map data may be informed of the presence of the speed funnel and appropriate navigation assistance (reduce vehicle speed or switch from autonomous mode to manual driving mode) may be provided. The speed funnel also corresponds to upcoming travel zone and the method further comprises sending notification to one or more vehicles about upcoming travel zone so that the speed of the vehicle may be adjusted.

The method 900 may be implemented using corresponding circuitry. For example, the method 900 may be implemented by an apparatus or system comprising a processor, a memory, and a communication interface of the kind discussed in conjunction with FIG. 2.

In some example embodiments, a computer programmable product may be provided. The computer programmable product may comprise at least one non-transitory computer-readable storage medium having stored thereon computer-executable program code instructions that when executed by a computer, cause the computer to execute the method 900.

In an example embodiment, an apparatus for performing the method 900 of FIG. 9 above may comprise a processor (e.g. the processor 201) configured to perform some or each of the operations of the method of FIG. 6 described previously. The processor may, for example, be configured to perform the operations (901-911) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (901-911) may comprise, for example, the processor 201 which may be implemented in the system 101 and/or a device or circuit for executing instructions or executing an algorithm for processing information as described above.

In this way, example embodiments of the invention result in detection of speed funnel in a region. The speed funnels detected may correspond to upcoming one or more of a roadwork zone, a city start location, a tunnel, a bridge, a road curvature region, a travel zone, or a freeway merging zone. The detected speed funnel may also be used to determine whether the freeway is about to end or the city road is about to start. This application scenario is also very important to the autonomous driving applications because it is associated with a major change of road conditions. Similarly, the detected speed funnel can also be a good indicator if vehicles enter sensitive locations. In these locations, the drivers are alerted to behave cautiously. Thus, the detected speed funnel may be notified to the user so that the speed of the vehicle can be adjusted. Alternatively, detecting speed funnels may be used for updating the map database 103a. Moreover, the invention also provides privacy aspect by truncating the observations captured by plurality of vehicles. Therefore, embodiments of the present disclosure may provide improvements in the map database 103a and/or the navigation assistance provided using such map data.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method for detecting a speed funnel in a region, the method comprising:
   obtaining a plurality of traffic object observations for the region;
   determining at least one first learned traffic object, based on feature-based clustering of the plurality of traffic object observations;
   generating at least one candidate traffic object group by grouping, based on a filtering criteria, the at least one first learned traffic object and a second learned traffic object;
   performing validation of the at least one candidate traffic object group based on a statistical model;
   generating at least one validated candidate traffic object group as a result of the validation of the at least one candidate traffic object group, wherein the at least one validated candidate traffic object group comprises a group of traffic objects connected by a true route; and
   merging the at least one validated candidate traffic object group with a second validated candidate traffic object group to detect the speed funnel.

2. The method of claim 1, wherein determining the at least one first learned traffic object based on the feature-based clustering of the plurality of traffic object observations comprises:
   determining a first cluster of traffic object observations, based on a location criteria;
   determining a second cluster of traffic object observations from the first cluster of traffic object observations, based on a direction criteria;
   computing an average location parameter value and an average direction parameter value for the second cluster of traffic object observations; and
   determining the at least one first learned traffic object as a traffic object corresponding to the average location parameter value and the average direction parameter value.

3. The method of claim 1, wherein the filtering criteria comprises one or more of:
   a first condition that a distance between the at least one first learned traffic object and the second learned traffic object is greater than a first threshold distance and less than a second threshold distance;
   a second condition that an angle between a driving direction of the at least one first learned traffic object and a second driving direction of the second learned traffic object is less than a threshold angle;
   a third condition that the at least one first learned traffic object and the second learned traffic object satisfy a sight criteria; and
   a fourth condition that a difference between a speed value associated with the at least one first learned traffic object and a second speed value associated with the second learned traffic object is less than a threshold speed value.

4. The method of claim 1, wherein merging the at least one validated candidate traffic object group with a second validated traffic object group to detect the speed funnel comprises:
   filtering traffic objects in the at least one validated candidate traffic object group and the second validated traffic object group based on a distance criteria to obtain a set of filtered traffic objects;
   determining a parameter value associated with each traffic object in the set of filtered traffic objects; and
   merging the at least one validated candidate traffic object group and the second validated traffic object group, based on the parameter value associated with each traffic object in the set of filtered traffic objects.

5. The method of claim 1, further comprising updating the map data of the region based on the detected speed funnel.

6. The method of claim 1, wherein the statistical model is a Hidden Markov Model.

7. The method of claim 1, wherein performing validation of the at least one candidate traffic object group comprises:
   determining map matched link data associated with each learned traffic object in the at least one candidate traffic object group, based on map data of the region;
   determining a connecting probability value between the at least one first learned traffic object and the second learned traffic object in the at least one candidate traffic object group, based on one or more transition probability values associated with the statistical model; and
   performing validation of the at least one candidate traffic object group based on the connecting probability value.

8. The method of claim 7, further comprising:
   determining the one or more transition probability values based on the map matched link data associated with respective learned traffic object of the at least one candidate traffic object group; and
   determining the connecting probability based on a function of the one or more transition probability values.

9. The method of claim 8, wherein the one or more transition probability values further comprise one or more of:
   a first transition probability value associated with a connectivity feature of the map-matched link data associated with respective learned traffic object in the at least one candidate traffic object group;
   a second transition probability value associated with a driving direction change feature of the map-matched link data associated with each learned traffic object in the at least one candidate traffic object group; or
   a third transition probability value associated with an on route distance between the at least one first learned traffic object and the second learned traffic object in the at least one candidate traffic object group.

10. The method of claim 1,
    wherein the detected speed funnel corresponds to an upcoming travel zone, and
    wherein the method further comprises sending a notification to one or more vehicles about the upcoming travel zone.

11. The method of claim 10, wherein sending the notification further comprises sending an instruction to adjust a vehicle speed.

12. The method of claim 11, wherein the adjusting the vehicle speed comprises decelerating the one or more vehicles within a threshold distance from start of the upcoming travel zone.

13. The method of claim 12, wherein the upcoming travel zone comprises one or more of a roadwork zone, a city start location, a tunnel, a bridge, a road curvature region, or a freeway merging zone.

14. A system for detecting a speed funnel in a region, the system comprising:
    a memory configured to store computer-executable instructions; and
    one or more processors configured to execute the instructions to:
       obtain a plurality of traffic object observations for the region;

determine at least one first learned traffic object, based on feature-based clustering of the plurality of traffic object observations;

generate at least one candidate traffic object group by grouping, based on a filtering criteria, the at least one first learned traffic object with a second learned traffic object;

perform validation of the at least one candidate traffic object group based on a statistical model;

generate at least one validated candidate traffic object group as a result of the validation of the at least one candidate traffic object group, wherein the at least one validated candidate traffic object group comprises a group of traffic objects connected by a true route; and merge the at least one validated candidate traffic object group with a second validated candidate traffic object group to detect the speed funnel.

15. The system of claim 14, wherein the filtering criteria comprises one or more of:
a first condition that a distance between the at least one first learned traffic object and the second learned traffic object is greater than a first threshold distance and less than a second threshold distance;
a second condition that an angle between a driving direction of the at least one first learned traffic object and a second driving direction of the second learned traffic object is less than a threshold angle;
a third condition that the at least one first learned traffic object and the second learned traffic object satisfy a sight criteria; and
a fourth condition that a difference between a speed value associated with the at least one first learned traffic object and a second speed value associated with the second learned traffic object is lesser than a threshold speed value.

16. The system of claim 14, wherein to perform validation of the at least one candidate traffic object group, the one or more processors are further configured to:
determine map matched link data associated with each learned traffic object in the at least one candidate traffic object group, based on a map data of the region;
determine a connecting probability value between the at least one first learned traffic object and the second learned traffic object in the at least one candidate traffic object group based on one or more transition probability values associated with the statistical model; and
perform validation of the at least one candidate traffic object group based on the connecting probability value.

17. The system of claim 16, wherein the one or more processors are further configured to:
determine the one or more transition probability values based on the map matched link data associated with respective learned traffic object of the at least one candidate traffic object group; and
determine the connecting probability based on a function of the one or more transition probability values.

18. The system of claim 16, wherein the one or more transition probability values further comprise one or more of:
a first transition probability value associated with a connectivity feature of each map-matched link data associated with respective learned traffic object in the at least one candidate traffic object group;
a second transition probability value associated with a driving direction change feature of each map-matched link data associated with each learned traffic object in the at least one candidate traffic object group; and
a third transition probability value associated with an on route distance between the at least one first learned traffic object and the second learned traffic object in the at least one candidate traffic object group.

19. The system of claim 16, wherein to determine at least one first learned traffic object based on the feature-based clustering of the plurality of traffic object observations, the one or more processors are further configured to:
determine a first cluster of traffic object observations, based on a location criteria;
determine a second cluster of traffic object observations from the first cluster of traffic object observations, based on a direction criteria;
compute an average location parameter value and an average direction parameter value for the second cluster of traffic object observations; and
determine the at least one first learned traffic object as a traffic object associated with the average location parameter value and the average direction parameter value.

20. A computer programmable product comprising a non-transitory computer readable medium having stored thereon computer executable instruction which when executed by one or more processors, cause the one or more processors to carry out operations for detecting a speed funnel in a region, the operations comprising:
obtaining a plurality of traffic object observations for the region;
determining at least one first learned traffic object, based on feature-based clustering of the plurality of traffic object observations;
generating at least one candidate traffic object group by grouping, based on a filtering criteria, the at least one first learned traffic object with a second learned traffic object;
performing validation of the at least one candidate traffic object group based on a statistical model;
generating at least one validated candidate traffic object group as a result of the validation of the at least one candidate traffic object group, wherein the at least one validated candidate traffic object group comprises a group of traffic objects connected by a true route; and
merging the at least one validated candidate traffic object group with a second validated candidate traffic object group to detect a speed funnel.

* * * * *